Figure 1:
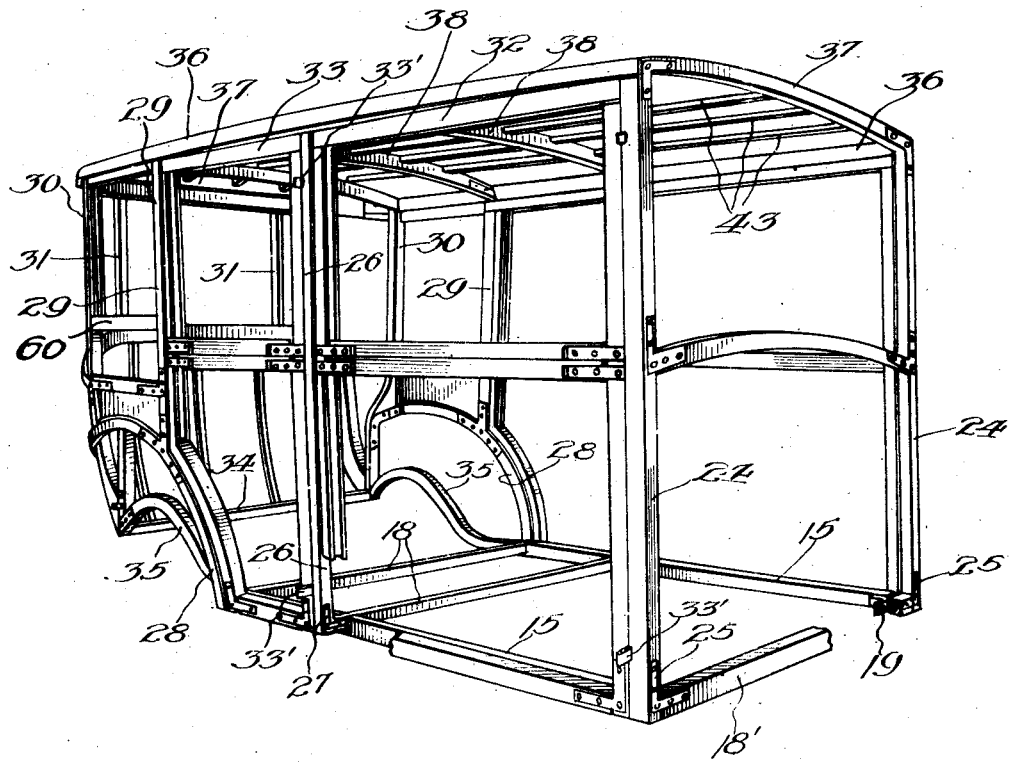

Dec. 11, 1928.

C. T. WEYMANN 1,694,572

CLOSED ROAD MOTOR VEHICLE BODY

Filed March 27, 1925    4 Sheets-Sheet 1

Inventor:
Charles Terres Weymann,

Dec. 11, 1928.                                                    1,694,572
C. T. WEYMANN
CLOSED ROAD MOTOR VEHICLE BODY
Filed March 27, 1925            4 Sheets-Sheet 2
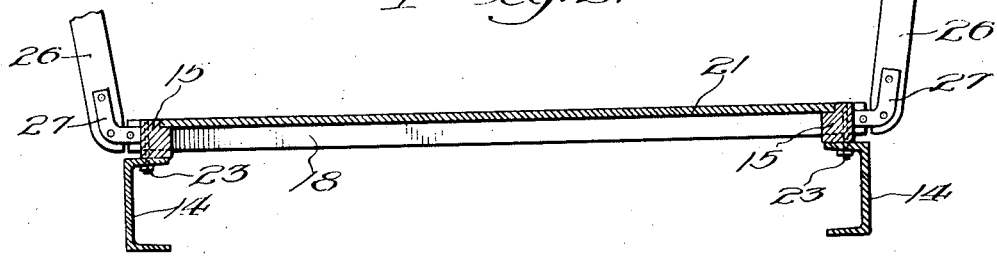
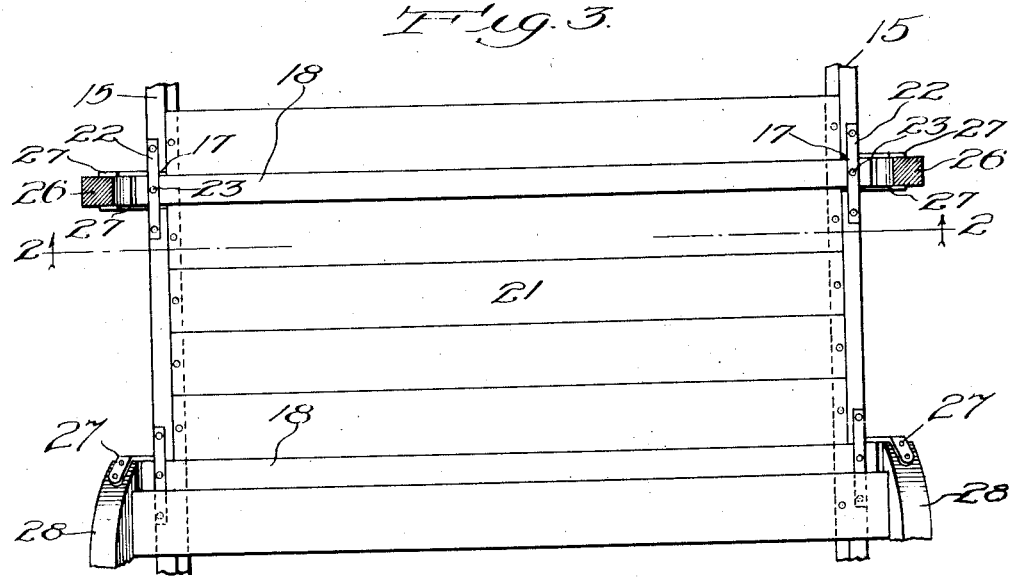
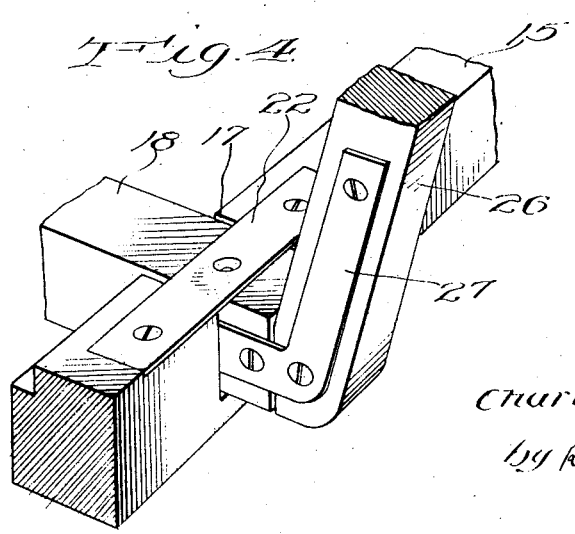

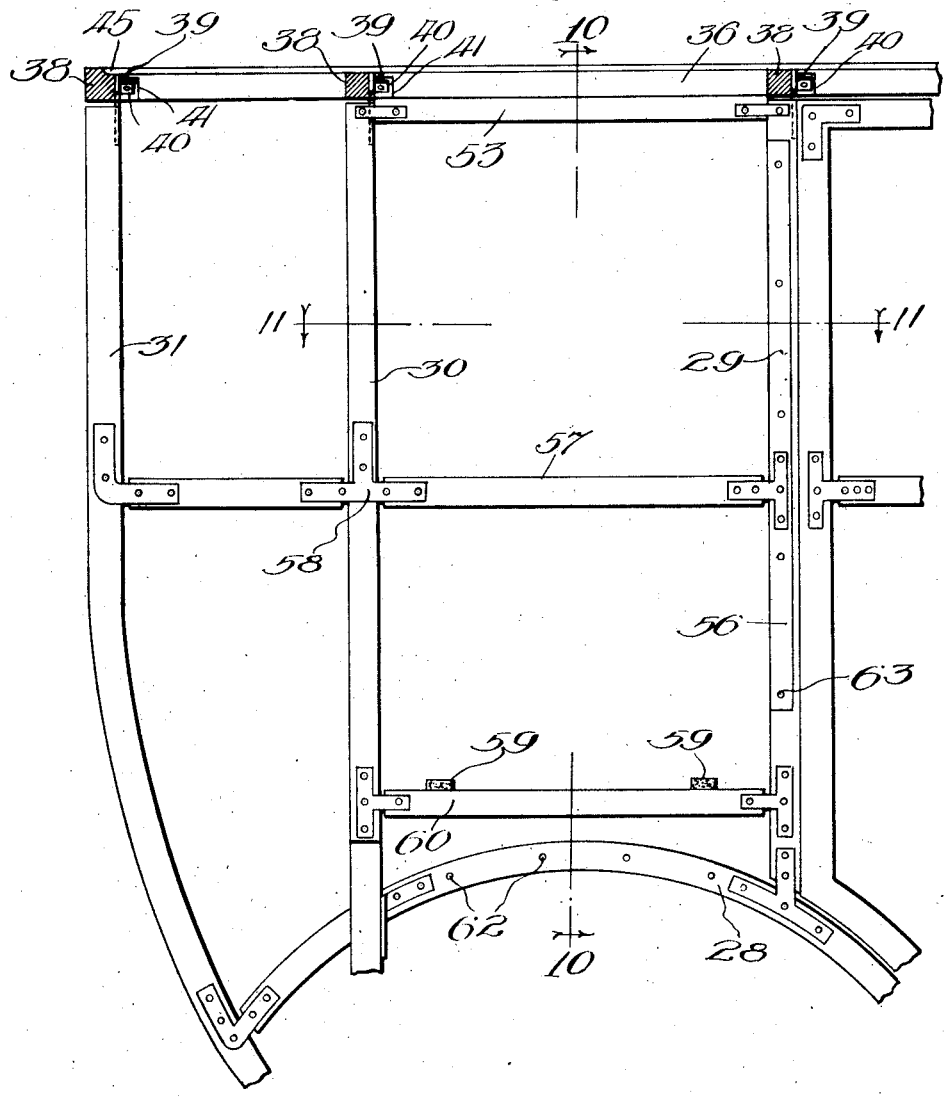

Dec. 11, 1928.  
C. T. WEYMANN  
1,694,572  
CLOSED ROAD MOTOR VEHICLE BODY  
Filed March 27, 1925 4 Sheets-Sheet 4
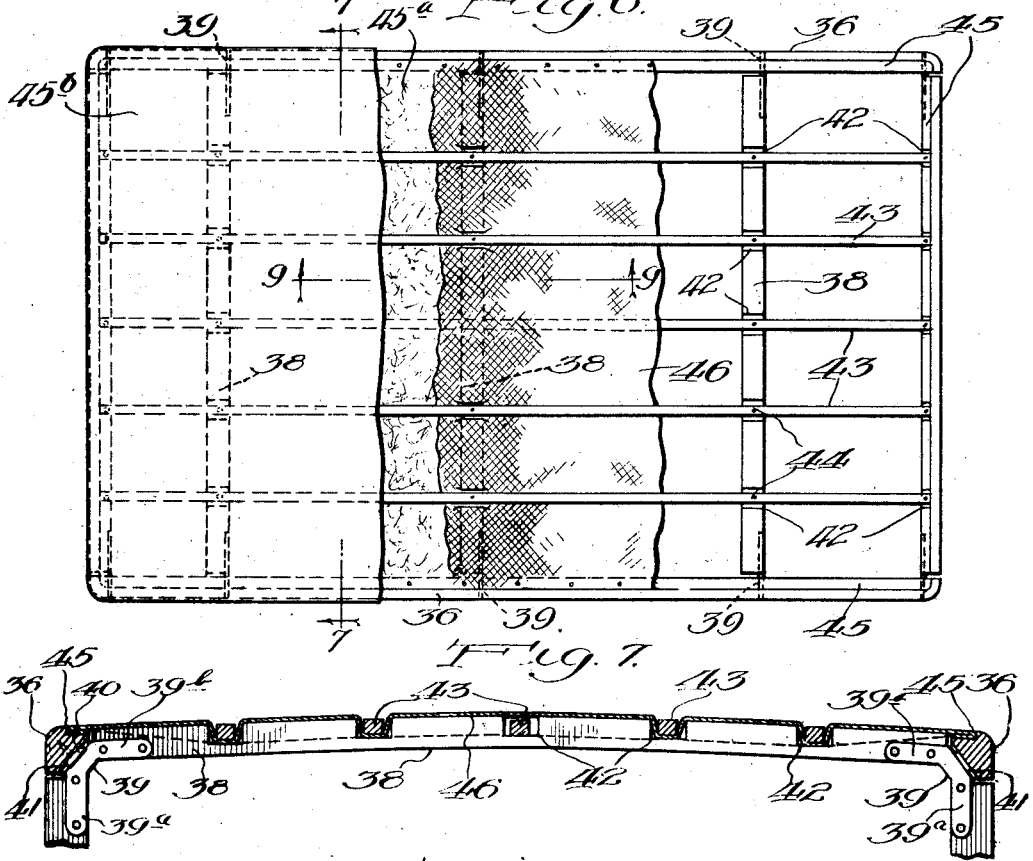
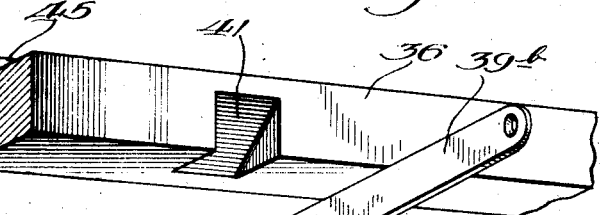
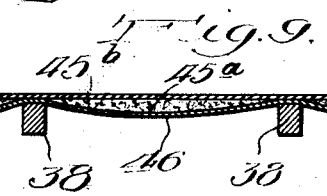
Inventor:  
Charles Terres Weymann  
by Rector, Hibben, Davis and Macauley Attys.

Patented Dec. 11, 1928.

1,694,572

UNITED STATES PATENT OFFICE.

CHARLES TERRES WEYMANN, OF PARIS, FRANCE.

CLOSED ROAD-MOTOR-VEHICLE BODY.

Application filed March 27, 1925. Serial No. 18,714.

My invention relates to vehicle bodies and more particularly to bodies of the closed type for automobiles and the like.

One of the principal objects of my invention is to improve bodies of the well-known Weymann type, which are adapted to weave or flex with the chassis frame. This type of flexible body is well exemplified in United States Letters Patent No. 1,519,093, granted to me December 9, 1924.

An important feature of my invention is the provision of a novel top or roof construction, which is extremely light in weight, is adapted to weave or flex with the rest of the body, and is free from noise and vibration. The roofs of closed vehicles bodies as heretofore constructed have been heavy in weight, practically rigid or inflexible in operation, and noisy as they have acted much like sounding boards with the result that vibrations of the vehicle and engine and rattles and noise, due to loose joints and other causes, are set up in or transmitted to the roofs and amplified, to the discomfort and annoyance of the passengers. With my invention I eliminate these objections by constructing the skeleton of the roofs of light pieces of wood and covering it with layers of fabric or the like with suitable padding material between the layers.

Still another object of my invention is to provide a novel form of Weymann joint between certain of the pieces making up the skeleton of the body.

With the above and incidental objects in view, the invention consists in certain novel features of construction and combination of parts, the essential elements of which are recited in the appended claims and the preferred form of embodiment of which is described in detail hereinafter and illustrated in full in the accompanying drawings, which form part of this specification.

Of said drawings, Figure 1 is a perspective view of the skeleton frame of the body embodying my invention; Fig. 2 is a detail cross-sectional view taken through the floor of the body and the side sills of the chassis frame, as on the line 2—2 of Fig. 3; Fig. 3 is a fragmentary top plan view of part of the floor structure of the body; Fig. 4 is a fragmentary perspective showing the manner of forming and connecting the lower ends of the vertical posts of the skeleton frame to transverse bars of the floor structure; Fig. 5 is an inside elevation of the rear portion of one side of the skeleton frame showing the roof cross bows in section; Fig. 6 is a top plan view of the top or roof showing parts of the water-proof covering and padding broken away; Fig. 7 is a cross-section through the top, being taken along one of the cross bows as on the line 7—7 of Fig. 6; Fig. 8 is a fragmentary perspective view showing in separated relation a portion of a top side rail and the novel form of bracket for connecting the rail to the vertical supporting posts and the top cross bows; and Fig. 9 is a fragmentary section through a portion of the finished roof as on the line 9—9 of Fig. 6.

Referring to Figs. 1, 2 and 3, the bottom side rails 15 of the floor structure are adapted to rest on the side sills 14 of the chassis frame, these side sills usually being channel-shaped in cross-section as illustrated in Fig. 2. These wooden rails 15 have notches or grooves 17 (Fig. 4) in which are seated two intermediate transverse supporting pieces of wood 18. The rails 15 are formed of relatively light pieces of wood, being employed in place of the extremely heavy and solid timbers used as base rails in standard types of bodies. The front transverse supporting member 18' (Fig. 1) is preferably connected to the forward ends of the side rails 15 by Weymann joints, comprising L-shaped brackets 19 of flexible strips of metal, which are connected to the wooden pieces by means of bolts or rivets. The inner top edges of the side pieces 15 are cut away to accommodate and support the ends of the floor boards 21, the top surfaces of the floor boards, the side rail members 15 and the transverse bars 18 being in the same horizontal plane. In order to maintain the side rails 15 and cross bars 18 in assembled relation before the body is mounted on the chassis frame, I employ metal straps 22 secured to the side rails, as shown in Fig. 4. As shown in Figs. 2 and 3, bolts 23 project through the straps 22, the transverse bars 18, the side rails 15 and the upper flanges of the side sills 14, of the chassis frame, when the body is secured to the chassis frame. The grooves 17 are wider than the transverse pieces 18 and these pieces and the side rails are connected together at each point of intersection by a single bolt 23 to permit the floor structure to weave or flex with the chassis frame.

Front vertical posts 24 (Fig. 1) are connected at their lower ends to the ends of the front transverse member 18' by Weymann joints 25. The intermediate vertical posts 26 (Figs. 1, 2, 3 and 4) have their lower portions inclined slightly inwardly and are connected at their lower ends to the outer ends of the corresponding cross bar 18 by Weymann joints 27. Secured in like manner to the ends of the rear intermediate cross bar 18 are curved members 28 which support, through Weymann joints, vertical posts 29 and 30, as shown in Fig. 5. Rear corner posts 31 are supported at their lower ends on a rear transverse piece 34 (Fig. 1) and curved side pieces 35 are connected at their opposite ends to the transverse piece 34 and the rear transverse piece 18. As shown in Fig. 5, the rear ends of the curved pieces 28 are connected to the rear posts 31 by Weymann joints. As will be described presently, the top or roof is mounted through Weymann joints on the upper ends of the vertical posts 24, 26, 29, 30 and 31.

The frames of the front and rear doors 32 and 33 on each side of the body are formed of vertical and horizontal pieces of wood joined together by Weymann joints. The front doors are hung on the posts 24 and the rear doors on the posts 26 by light hinges 33'. It will be noted that the lower ends of the posts 24 and 26 and of the pieces 29 are positioned outside of the side rails so that while the doors are positioned between these posts and pieces and are flush with them when closed, the bottom horizontal members of the door frames are outside the side rails 15 and in the same horizontal plane. Thus, by extending the ends of the transverse supporting pieces 18 beyond the side rails 15 and securing the posts to them, the body may be made wider and the doors extended further downward to cover the side rails, thus affording more space or room within the body, while at the same time the body is improved in appearance and the side rails 15 do not require a finishing cover or treatment which would be necessary if they were exposed below the doors. The side portions and back of the body are covered with fabric, leather or the like 35' (Fig. 10) which is used in place of the metal panels ordinarily used on other types of bodies.

The frame of the roof structure, as shown in Figs. 1, 6 and 7, includes side rails 36, connecting front and rear bows 37 and intermediate parallel cross-bows 38. As shown in Figs. 5 to 8, I preferably connect the upper ends of the vertical posts, the side rails 36, and the respective cross-bows together by brackets 39 of a novel form, best shown in Figs. 7 and 8. These brackets 39 are formed of flexible metal and have downwardly extending legs 39$^a$ secured by two rivets or bolts to the vertical posts, horizontally extending legs 39$^b$ secured by two rivets or bolts to the cross-bows, and laterally-extending inclined ears 40 connected by one screw to the side rails 36. The side rails are provided with recesses 41 having inclined bottoms against which the ears 40 seat. It will be obvious that these brackets are simple in construction and yet effective and operate on the Weymann principle as they permit the roof, as well as the rest of the skeleton frame of the body, to flex or weave with the chassis frame, it being understood that the various wooden pieces of the skeleton are spaced apart at their points of joinder so that the pieces do not touch, thus eliminating noise and allowing such action.

The end bows 37 and the intermediate cross bows 38 are provided with recesses and grooves 42, which, as best shown in Fig. 7, are wider than longitudinally extending flexible strips of wood 43 which are seated in these recesses and grooves and are secured to each of the bows by a single screw or nail 44, so that the strips do not interfere with the weaving action of the roof. In assembling the top, the side rails and cross bows are first connected together and the middle strip 43 nailed in place, and then fabric or other flexible material 46, such as canvas, is stretched over the bows and the edges are tacked to the side rails and end bows, these pieces being grooved or recessed, as indicated at 45, in order to permit the edge of the canvas to be turned in and the top of the canvas to be flush with the tops of these pieces, thus avoiding ridges. Then the other longitudinal pieces 43 are screwed into place, thus further stretching the canvas. The canvas is now covered with padding or wadding 45$^a$ preferably hair, which is so distributed as to be thickest at the center of the pockets formed between the wooden pieces of the roof. Finally the top covering material, 45$^b$ is stretched tightly over the wadding and its edges secured to the side rails and end bows. If desired, a suitable lining of cloth may be stretched over the under side of the roof in order to give it the desired finish.

It will be obvious that this top is much lighter than those heretofore used on enclosed bodies of automobiles, while at the same time it is simple in construction, cheap to manufacture and assemble and entirely free from noise and rumble which is a very important desideratum.

From the foregoing description it will be obvious that my improvements are well adapted to fulfill the objects primarily stated. While these improvements are particularly adaptable for use on the Weymann type of body it will be evident that certain features, such as the roof construction, may be employed on bodies of other types to advantage. The term "fabric" herein is intended to mean woven fabrics, imitation leather, leather, and the like.

I claim:
1. In a road motor vehicle body, the combination of vertical posts, and a roof structure comprising side rails supported on said posts, a plurality of cross bows having grooves, fabric covering the cross bows, longitudinal pieces positioned over said fabric and in said grooves, padding distributed over said fabric, and a top finishing fabric stretched over said padding.

2. In a road motor vehicle body, the combination of vertical posts and a roof structure comprising side rails supported on said posts, a plurality of cross bows, a lower layer of fabric on said cross bows, a plurality of spaced longitudinal pieces mounted on the cross bows so as to hold said lower fabric in place thereon, padding distributed on said fabric, and a finishing fabric stretched over said padding and secured to the side rails and end cross bows.

3. In a road motor vehicle body, the combination of vertical posts, and a roof structure comprising side rails supported on said posts, cross bows connected to said side rails, fabric stretched over said cross bows, spaced longitudinal pieces positioned over said fabric and secured to the cross bows, padding distributed on the canvas and in the pockets formed between the rails, bows and pieces, and a finishing fabric stretched tightly over said padding.

4. In a road motor vehicle body, the combination of vertical posts, and a roof construction constructed to weave with the body and comprising side rails, cross bows, yielding joints for connecting the rails and cross bows together and connecting the rails to the vertical posts, fabric stretched over said cross bows, longitudinal pieces secured to said cross bows and mounted over said fabric, padding distributed over said fabric, and a finishing fabric stretched tightly over said padding.

5. In a road motor vehicle body, the combination of vertical posts, and a roof mounted on said posts, constructed to weave with the body and comprising side rails, cross bows having grooves, yielding joints for connecting the cross bows and side rails together, a lower fabric stretched over said cross bows, flexible longitudinal pieces positioned over the lower fabric and in said grooves, screws for connecting the cross bows and longitudinal pieces together at their points of intersection there being one screw at each point, padding distributed over said lower fabric, and a finishing fabric stretched over said padding.

6. In a road motor vehicle body, the combination of vertical posts, and a roof structure comprising side rails supported on said posts and having recesses extending lengthwise thereof, cross bows having grooves extending crosswise thereof, fabric covering said bows, spaced longitudinal pieces positioned over said fabric and in said grooves, the edge of the fabric being secured in said recesses in the said side rails, padding distributed over said fabric and a finishing fabric stretched over said padding.

7. In a road motor vehicle body, the combination of vertical posts, and a roof structure supported thereon and comprising side and end pieces having recesses extending lengthwise, spaced longitudinal and transverse pieces between the side and end pieces, fabric forming pockets between said pieces, padding distributed in said pockets, means for securing the edge of said fabric in said recesses, and a finishing fabric stretched tightly over said padding.

8. In a road motor vehicle body, the combination of vertical posts, a flexible roof structure comprising side rails and cross bows and metal brackets each comprising a downwardly extending leg secured to the upper end of one of the posts, a horizontal leg secured to one of the cross bows and a laterally extending portion secured to one of the side rails so that the bows, posts and side rails do not contact with each other, and the same may move relative to each other.

9. In a road motor vehicle body, the combination of vertical posts, a roof structure comprising side rails and cross bars, the side rails being provided with sunken inclined surfaces, and metal brackets each having a downwardly extending leg secured to the upper end of one of the posts, a horizontal leg secured to the end of one of the cross bows and a laterally extending inclined portion engaging one of said inclined surfaces and secured thereto, the brackets maintaining the ends of the posts and cross bars and the rails spaced apart so that they do not contact.

10. In a road motor vehicle body constructed to weave with the chassis frame, the combination of vertical posts, a flexible roof structure comprising continuous side rails and cross bows, metal brackets, and means for connecting each bracket to the upper end of a post, the end of a cross bow and a side rail so that the same are out of contact and may move relative to each other.

11. In a road motor vehicle body constructed to weave with the chassis frame, the combination of vertical posts, a flexible roof frame comprising continuous side rails and cross bars, metal brackets each comprising a downwardly extending leg, a horizontal leg and a laterally extending lug, two screws for connecting each leg to the post or bow and one screw for connecting the lug to the side rail.

12. In a road motor vehicle body, the combination of vertical posts, and a roof structure comprising side rails supported on said posts, a plurality of cross bows having grooves, longitudinal pieces positioned in said grooves, a fabric covering said cross bows, loose padding distributed over said fabric so that it is thickest at the centers of the spaces between the cross bows and longitudinal pieces and reduced in thickness towards the cross bows and longitudinal pieces, and a top finishing fabric stretched tightly over the padding which is pressed into the pockets formed by the sagging of the first covering so that the top fabric presents a smooth unbroken surface.

13. In a road motor vehicle body, the combination of vertical posts, and a roof structure supported thereon and comprising side rails and end pieces, the latter having recesses, flexible connections between the side rails and end pieces, longitudinal pieces having their ends positioned in said recesses and being narrower than said recesses to permit relative movement between the end pieces and ends of the longitudinal pieces, cross bows under the longitudinal pieces, and a covering over said roof structure.

14. In a road motor vehicle adapted to weave with the chassis frame, the combination of posts, and a roof structure thereon and comprising side rails, a plurality of spaced apart cross bows, the cross bows having grooves, longitudinal pieces extending through said grooves and narrower than the grooves to permit relative movement between the cross bows and the longitudinal pieces, a fabric over said cross bows, padding on said fabric and a top covering stretched over said padding.

CHARLES TERRES WEYMANN.